US008095871B2

(12) United States Patent
Liu et al.

(10) Patent No.: US 8,095,871 B2
(45) Date of Patent: Jan. 10, 2012

(54) SYSTEM AND METHOD FOR GUI SUPPORTED SPECIFICATIONS FOR AUTOMATING FORM FIELD EXTRACTION WITH DATABASE MAPPING (75) Inventors: Peiya Liu, East Brunswick, NJ (US); Sridharan Palanivelu, Plainsboro, NJ (US); Liang H. Hsu, Irvine, CA (US)

(73) Assignee: Siemens Corporation, Iselin, NJ (US)

( * ) Notice: Subject to any disclaimer, the term of this patent is extended or adjusted under 35 U.S.C. 154(b) by 515 days.

(21) Appl. No.: 11/122,867

(22) Filed: May 5, 2005

(65) Prior Publication Data
US 2005/0273573 A1 Dec. 8, 2005

Related U.S. Application Data (60) Provisional application No. 60/568,809, filed on May 6, 2004.

(51) Int. Cl.
G06F 17/00 (2006.01)
G06F 17/21 (2006.01)
(52) U.S. Cl. ........................................ 715/239; 707/808
(58) Field of Classification Search ........................ None
See application file for complete search history.

(56) References Cited

U.S. PATENT DOCUMENTS

| 5,283,887 | A | * | 2/1994 | Zachery | 715/513 |
|---|---|---|---|---|---|
| 5,708,828 | A | * | 1/1998 | Coleman | 715/523 |
| 5,781,914 | A | * | 7/1998 | Stork et al. | 715/506 |
| 5,956,422 | A | * | 9/1999 | Alam | 382/181 |
| 6,003,048 | A | * | 12/1999 | Fallside | 715/210 |
| 6,031,625 | A | * | 2/2000 | Sherman et al. | 358/1.18 |
| 6,173,073 | B1 | * | 1/2001 | Wang | 382/176 |
| 6,202,072 | B1 | * | 3/2001 | Kuwahara | 715/207 |
| 6,336,124 | B1 | * | 1/2002 | Alam et al. | 715/523 |
| 6,408,302 | B1 | * | 6/2002 | Lee et al. | 707/102 |
| 6,442,573 | B1 | * | 8/2002 | Schiller et al. | 715/210 |
| 6,549,922 | B1 | * | 4/2003 | Srivastava et al. | 707/205 |
| 6,662,186 | B1 | * | 12/2003 | Esquibel et al. | 707/101 |
| 6,725,426 | B1 | * | 4/2004 | Pavlov | 715/205 |
| 6,757,870 | B1 | * | 6/2004 | Stinger | 715/234 |
| 6,996,589 | B1 | * | 2/2006 | Jayaram et al. | 707/204 |

(Continued)

FOREIGN PATENT DOCUMENTS
EP 1143357 A2 10/2001
(Continued)

OTHER PUBLICATIONS

Information Extraction—Utilizing Table Pattern, Yildiz et al, Aug. 2004.*
Converting Relational Database into XML Document, Fong et al, IEEE 2001.*
Table Extraction Using Conditional Random Fields, Pinto et al, SIGIR'03 Jul. 28-Aug. 1, 2003.*

(Continued)

Primary Examiner — Pierre Vital
Assistant Examiner — Augustine Obisesan
(74) Attorney, Agent, or Firm — Donald B. Paschburg; F. Chau & Associates, LLC (57) ABSTRACT A GUI (Graphical User Interface) supported specification method for form field extraction and database mapping in a computer system that includes converting a form file into a fixed electronic document format by using a GUI which is used to specify the form file and conversion parameters and extracting fields from the fixed electronic document format by using the GUI that is used to specify the fields to be extracted; and mapping the fields onto the database schema by using a GUI which is used to specify the mapping between the fields and the database schema.

10 Claims, 10 Drawing Sheets

U.S. PATENT DOCUMENTS

| | | | | |
|---|---|---|---|---|
| 2001/0054046 | A1* | 12/2001 | Mikhailov et al. | 707/500 |
| 2002/0116371 | A1* | 8/2002 | Dodds et al. | 707/3 |
| 2002/0129006 | A1* | 9/2002 | Emmett et al. | 707/1 |
| 2002/0178183 | A1* | 11/2002 | Meding | 707/509 |
| 2003/0140055 | A1 | 7/2003 | Doney et al. | |
| 2003/0140311 | A1* | 7/2003 | Lemon et al. | 715/513 |
| 2003/0142128 | A1* | 7/2003 | Reulein et al. | 345/742 |
| 2004/0019693 | A1 | 1/2004 | Grow et al. | |
| 2004/0181746 | A1* | 9/2004 | McLure et al. | 715/500 |
| 2005/0034062 | A1* | 2/2005 | Bufkin et al. | 715/512 |
| 2005/0071347 | A1* | 3/2005 | Chau et al. | 707/100 |
| 2006/0031757 | A9* | 2/2006 | Vincent, III | 715/513 |

FOREIGN PATENT DOCUMENTS

| | | |
|---|---|---|
| EP | 1253530 A2 | 10/2002 |
| WO | WO 03/083700 | 10/2003 |
| WO | WO 03/088032 | 10/2003 |

OTHER PUBLICATIONS

Layout and content extraction for pdf documents, Chao et al, LNCS 3163, pp. 213-224, 2004.*

Altova GMBH: Mapforce 2004 User Reference, 'Online! Apr. 24, 2004, pp. 67-102, XP002349061 United States of America ISBN: 0-9723-5595-2 Retrieved from the Internet: URL:www.altova.com> 'retrieved on Oct. 12, 2005! * abstract *.

Altova GMBH: Stylevision 2004 User Manual, 'Online! Apr. 24, 2004, pp. 330-353, XP002349062 United States of America ISBN: 0-9723-5595-2 Retrieved from the Internet: URL:www.altova.com> 'retrieved on Oct. 12, 2005! * abstract *.

"Electronic forms solutions using XML and PDF" Nov. 6, 2003, Retrieved from the internet:URL: http//www.adobe.com/eterprise/pdfs/xml_whitepaper.pdf[retrieved on Oct. 7, 2010].

* cited by examiner

SYSTEM AND METHOD FOR GUI SUPPORTED SPECIFICATIONS FOR AUTOMATING FORM FIELD EXTRACTION WITH DATABASE MAPPING

CROSS-REFERENCE TO RELATED APPLICATION

This application claims the benefit of U.S. Provisional Application No. 60/568,809 filed on May 6, 2004, titled as "GUI Support Specifications for Automating Form Field Extraction with Database Mapping", contents of which are incorporated herein by reference.

TECHNICAL FIELD

The present invention generally relates to data processing and more particularly to processing of GUI based specification for form processing and database mapping.

DISCUSSION OF THE RELATED ART

Forms are used to collect data in field about various activities (e.g., field surveys or maintenance checks). The data captured in forms format needs to be stored in a computer database. However, the data form and its field structure needs to be mapped to a database schema, which may not be identical to the field structure and layout of the form.

One approach would be to enable manual mapping of forms with their layout structure into a database mapping when designing databases. However, addition of new forms or changes to the older forms and databases is a possibility over time and hence can require a change in the mapping between the forms and the database schema. Hence, there is a need for a technique(s) for conveniently mapping a form data layout to a database schema.

A database maintainer can manually design or map a table that maps to forms which are used to collect data. However, the process would be relatively laborious if the number of forms is significant and/or if the forms contain detailed table structures in them. Hence, there is a need for an interactive and convenient system that can enable faster mapping of forms to databases.

SUMMARY

In one aspect of the invention, a GUI (Graphical User Interface) supported specification method for form field extraction and database mapping in a computer system includes converting a form file into a fixed electronic document format by using GUI which is used to specify the form file and conversion parameters. Fields are extracted from the fixed electronic document format by using the GUI that is used to specify the fields to be extracted; and mapping is performed for the fields into the database schema by using a GUI, which is used to specify the mapping between the fields and the database schema.

In another aspect of the invention, a multi-layer form field extraction and database mapping process is disclosed that includes converting a form file into a first layer format and then extracting fields from the first layer format through a graphical user interface by selecting portions of the first layer format and storing the selected portions in a second layer format. The fields stored in the second layer are mapped to a database schema.

BRIEF DESCRIPTION OF DRAWINGS

Exemplary embodiments of the present invention are described with reference to the accompanying drawings, of which.

DETAILED DESCRIPTION OF THE EXEMPLARY EMBODIMENTS

The exemplary embodiments of the present invention will be described with reference to the appended drawings.

Figure 1:
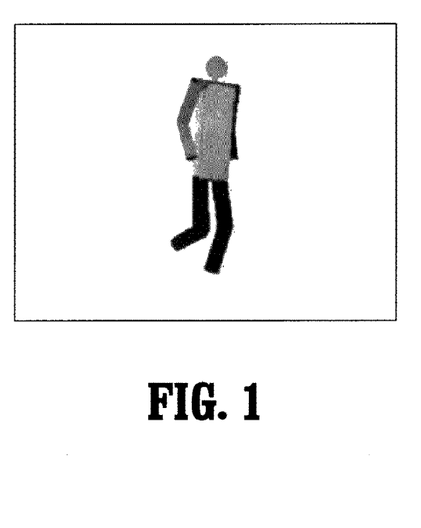
FIG. 1 shows a flowchart for processing a datasheet form and mapping it to a database in an exemplary embodiment of the invention.

FIG. 1 shows a flowchart for processing a datasheet form and mapping it to a database in an exemplary embodiment of the invention. Flowchart 10 shows the process of processing datasheet forms, which can be any type of form with data fields, figures, annotations, multi-media forms, either in paper format which is captured in an electronic form or an electronic form (e.g., a word processor file or a spreadsheet file).

The below steps 12-16 for converting, extracting and mapping are performed using a Graphical User Interface (GUI). At a step 12, a datasheet is converted from an electronic format (e.g., a word processor format) to a fixed document format (e.g., a Portable Document Format file—PDF) to maintain the internal alignment and appearance of the document. This converted PDF file forms a first layer of the form data processing and is performed through a GUI with user specifying the files to convert. The conversion process can be controlled through parameters. For example, conversion parameters can be the length of the file to be converted, batch processing of files, etc.

At a step 14, the converted PDF file is processed to create forms in an XML (extendible Markup Language) format as a first layer of processed form data. The XML format file is created by an extraction process that extracts information fields (e.g., header fields, radio fields, table row/column, entry fields, footer fields, etc.) in the PDF file. This extracted XML file forms a second layer of the form data processing and can be used to directly map the fields in the first layer (PDF file) onto a database table(s) for either importing or exporting data to the database. This step 14 is performed through a GUI with user specifying the field areas that are to be extracted.

At a step 16 a XML form to database mapping is performed to map the various information fields in the XML form that are extracted, for example, the header fields, radio fields, table row/column, entry fields, footer fields, etc., are mapped onto fields in database tables on a database(s). A multi-layer form data processing uses PDF and XML layers to enable a user to create a mapping from an electronic document format to a database. This step 16 is performed through a GUI with the user specifying the mapping between the extracted fields and the database tables.

Figure 2:
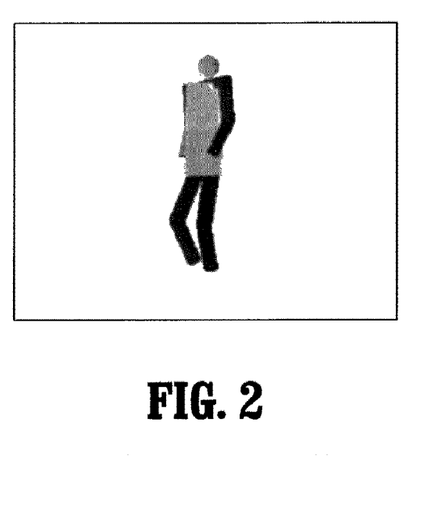
FIG. 2 shows an exemplary form extractor user interface.

FIG. 2 shows an exemplary form extractor user interface. To illustrate a graphical user interface in the form of a Portable Document File (PDF) interface 18 is shown that includes a form extractor plug-in 20 which can be invoked through a menu or a key-board shortcut. The GUI based interface 18 uses interactive menus, pointing device based area selection and other GUI operations to specify form field extraction and mapping the fields to a database schema. The form extraction process can be performed using a set of routines that can extract data from a PDF file. The form-extractor plug-in 20 allows the user to demarcate all the form fields in a PDF form file.

A datasheet form file is shown as loaded in the interface 18 and can be divided into different fields, for example, into header fields 22, radio fields 24, tables 26, entry fields 28 and footer fields 30. Those skilled in the art will appreciate that the fields mentioned above are only examples and any other types of fields on a form can be extracted to be mapped into a database.

Upon a user giving a command to extract the fields, the form extractor 20 plug-in extracts the field information and stores in XML format for data collection in the fields using a data-collector procedure (not shown) Each type of field can be extracted individually through user commands to build a database mapping.

Figure 3:
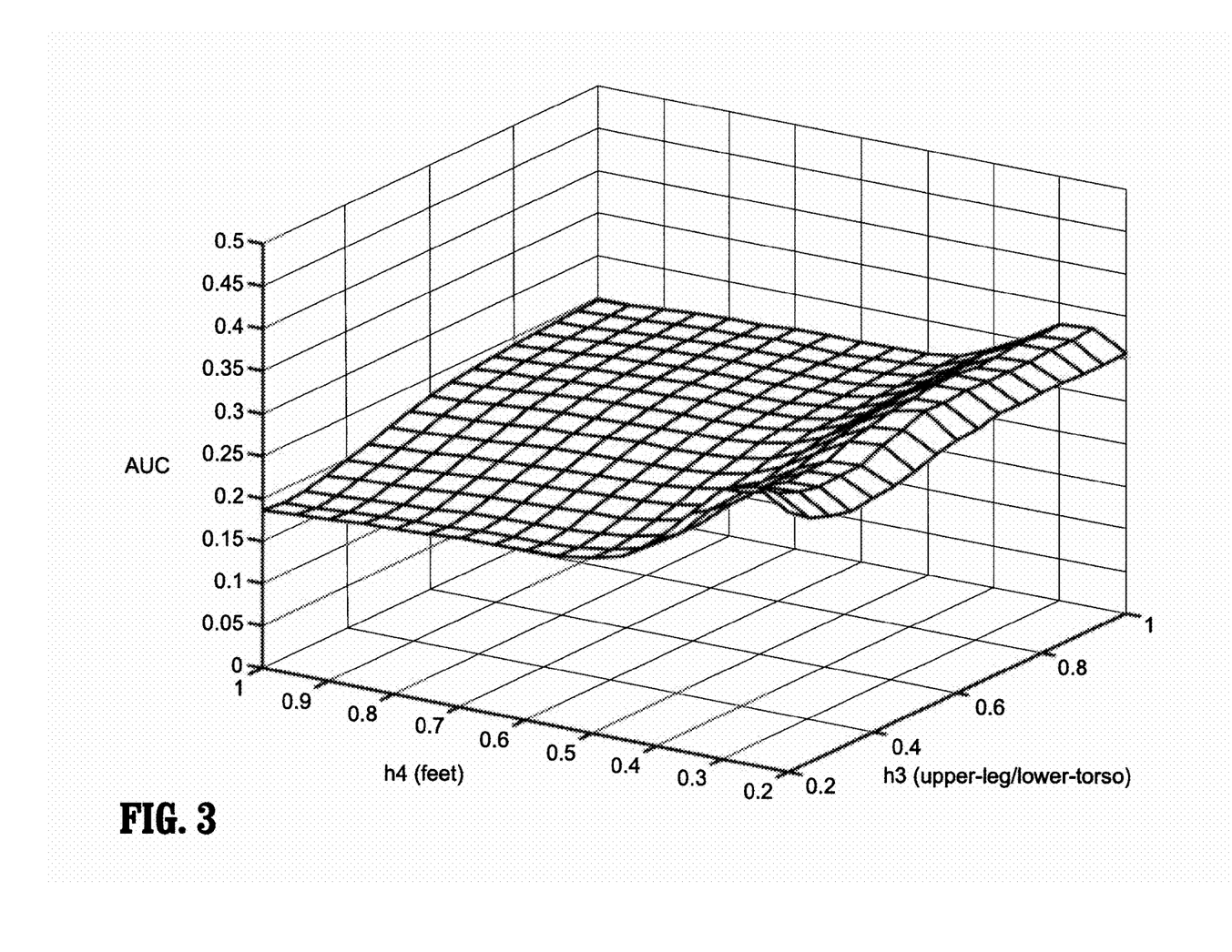
FIG. 3 shows the extraction and mapping process for header fields from a PDF file in an exemplary embodiment of the invention.

FIG. 3 shows the extraction and mapping process for header fields from a PDF file in an exemplary embodiment of the invention. In the PDF interface 18, an exemplary datasheet form 32, which is in a PDF format, is loaded. Header fields 34 are the fields to be extracted. The user uses a pointing device (e.g., a mouse) to mark the area in the PDF file that includes the header fields. Thereafter, a field properties dialog box 36 will appear which displays the titles or names for the selected header fields marked by the user through a pointing device. Header fields 38 can then be extracted to be stored in an XML file.

Similar to the above extraction of header fields 34, the radio fields 24 (See FIG. 2) can be extracted from the PDF file. User can mark an area around the radio fields 24 which can then be extracted into an XML format. Footer fields 30 can also be similarly extracted from a user demarcating the footer areas and then extracting the fields in that area.

Figure 4:
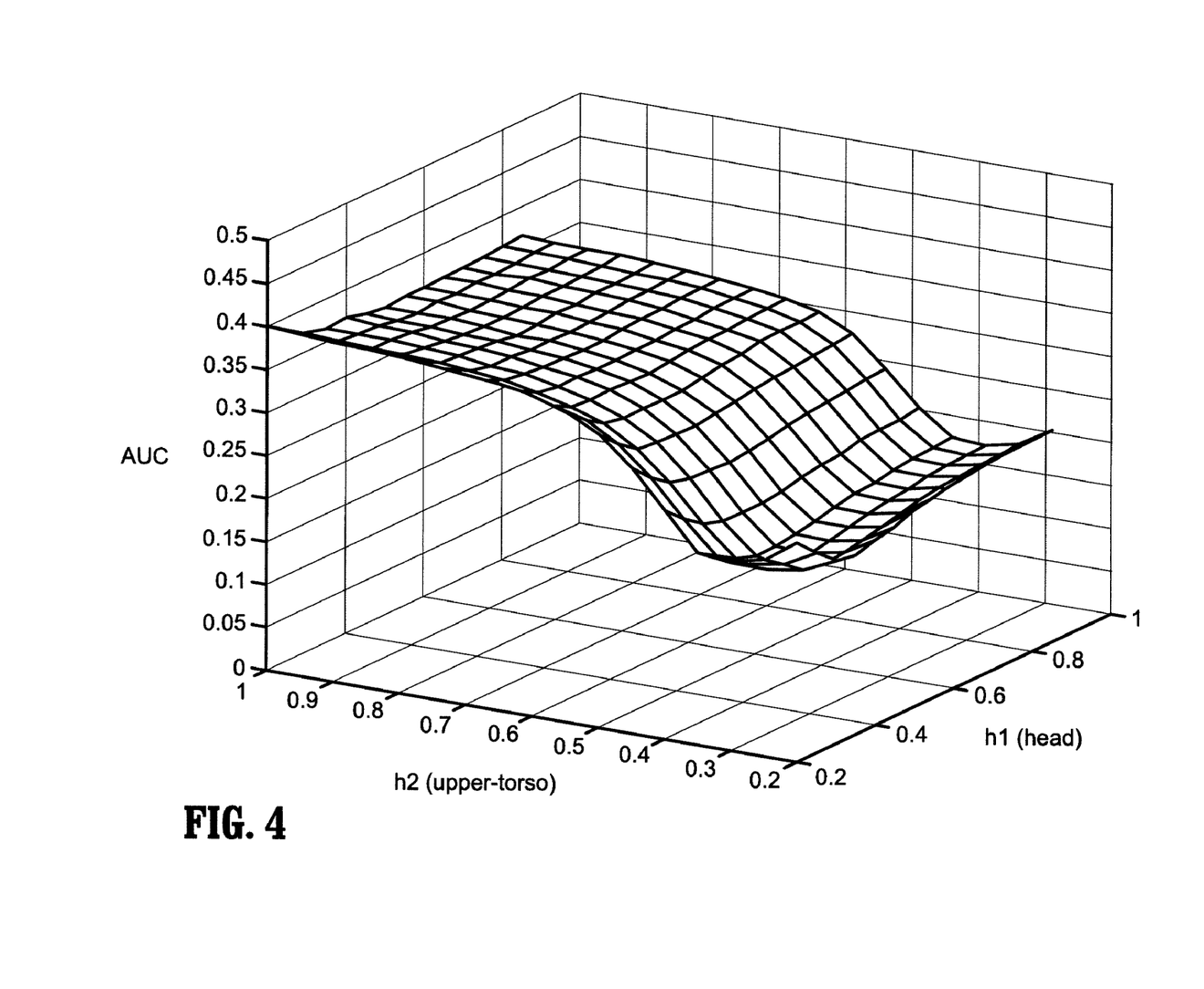
FIG. 4 shows the extraction and mapping process for table row and columns from a PDF file in an exemplary embodiment of the invention.

FIG. 4 shows the extraction and mapping process for table row and columns from a PDF file in an exemplary embodiment of the invention. PDF interface 18 shows the datasheet form 32 that includes a table 44 that has 3 columns and 16 rows. User can select the area of the table after giving a command for table extraction and mapping. After the table 44 has been marked by the user, a table dialog box 40 is initiated that allows entering of number of rows which map on to a database as the number of records in the table 44.

The table dialog box 40 shows the table fields 42 that were extracted from the table 44. To map the extracted table fields 42 to a particular table, a drop down list of available tables 46 allows user to map a field from the table 44 to any of the available tables 46. This enables the user to map the fields of the table 44 in the datasheet form 32 to multiple different tables. Thereafter a column list 48 is displayed to choose a column from the selected table from the tables 46 to which the one selected field 42 should be mapped to. This process is repeated for all the fields in the rows of the table 44 if necessary.

Figure 5:
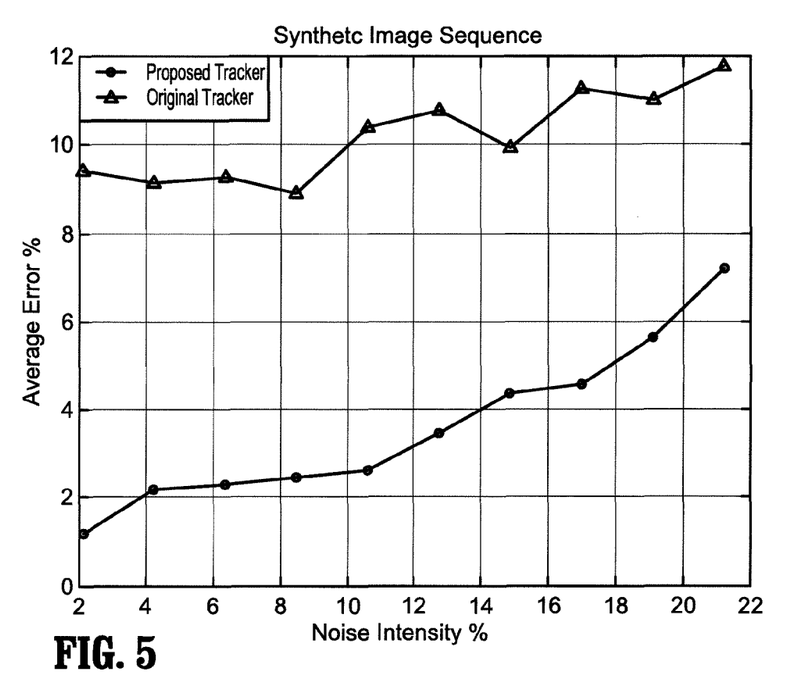
FIG. 5 shows the extraction and mapping process for table with multiple table groups from a PDF file in an exemplary embodiment of the invention.

FIG. 5 shows the extraction and mapping process for table with multiple table groups from a PDF file in an exemplary embodiment of the invention. The interface 18 shows a datasheet form 50 loaded. There are two table groups in the datasheet 50, viz., a table group 52 for rows 1-16 and a table group 54 for rows 17 to 32. Upon a user selecting an area of table to extract (similar to the above process for extracting table with no groups), a table dialog box 56 is initiated that shows fields 58. First the selected number of rows is specified which maps to number of records in a database table. The selected number of rows are extracted. The process is repeated for the table group 54.

Entry fields 28 can also be similarly extracted from a user demarcating the entry areas and then extracting the fields in that area that can be associated with appropriate tables.

Figure 6:
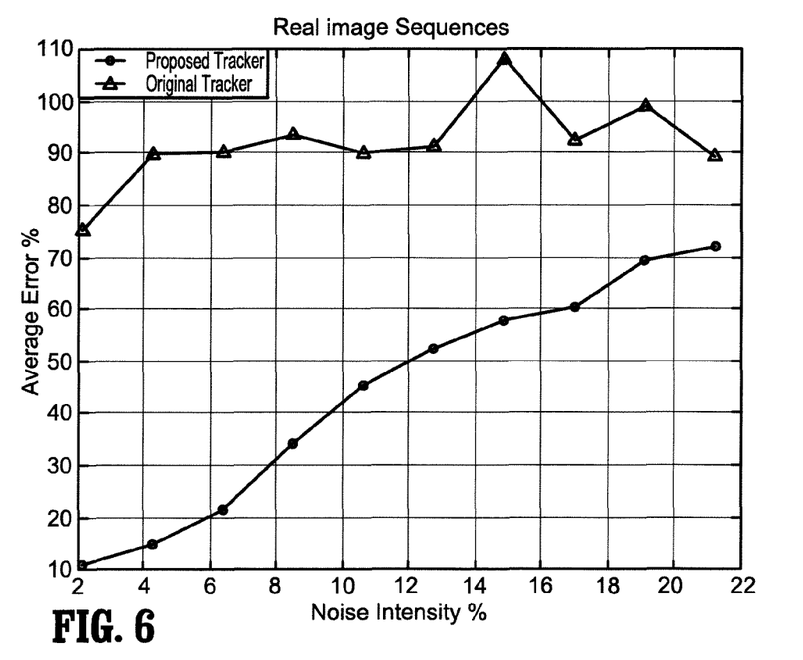
FIG. 6 shows a database mapping and an indexing technique used to extract and map form fields to a database in an exemplary embodiment of the invention.

FIG. 6 shows a database mapping and an indexing technique used to extract and map form fields to a database in an exemplary embodiment of the invention. An indexing technique is used to map each column in the datasheet to a column in a database table. In an interface 60 a datasheet form 62 is loaded which has to be mapped to a database table 64. Two table groups 52 and 54 have identical columns style number $66_b$, serial number $68_b$ and PM $70_b$ which map directly to the table fields style number $66_a$, serial number $68_a$ and PM $70_a$. An index field 72 is used to keep track of the order of rows.

Database mapping is performed through GUI selections described above for header fields, footer fields, tables and other fields in the PDF file form. The table in the form with groups 52 and 54 is mapped on to the database table 64's fields style number $66_b$, serial number $68_b$ and PM $70_b$ which map directly to the table fields style number $66_a$, serial number $68_a$ and PM $70_a$. The header field $74_b$ is mapped to the database table 64's field "chargeNo" $74_a$; the radio fields of disassembly $76_b$ and assembly $78_b$ map to database field 64's fields $76_a$ and $76_b$. The footer fields of $78_b$ and $80_b$ "reviewed by" and "date" map onto database fields $78_b$ and $80_b$.

Figure 7:
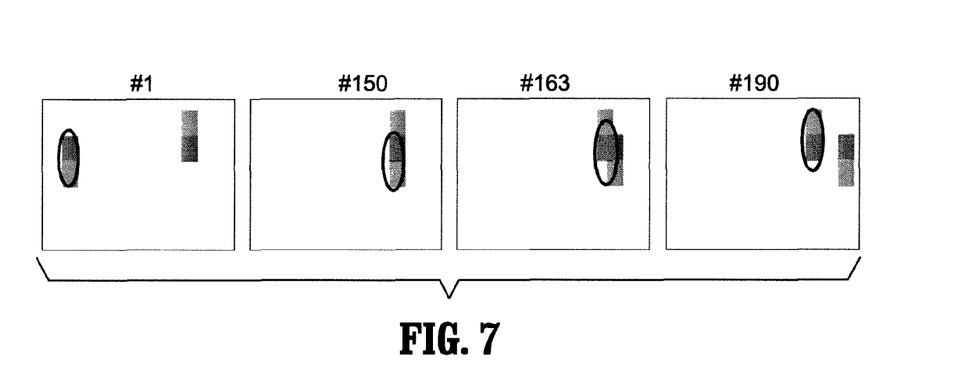
FIG. 7 is an exemplary computer system used to implement an embodiment of the present invention.
Figure 8:
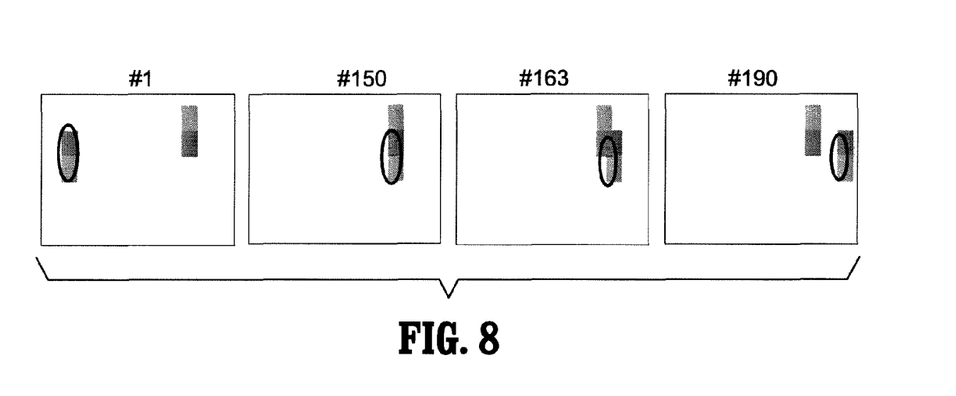
Figure 9:
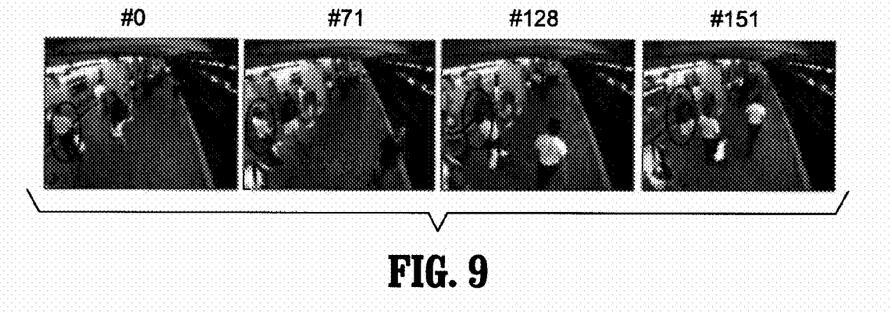
Figure 10:
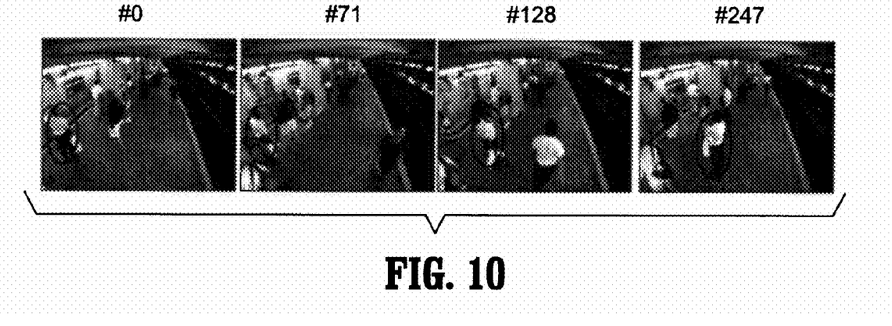
Figure 11:
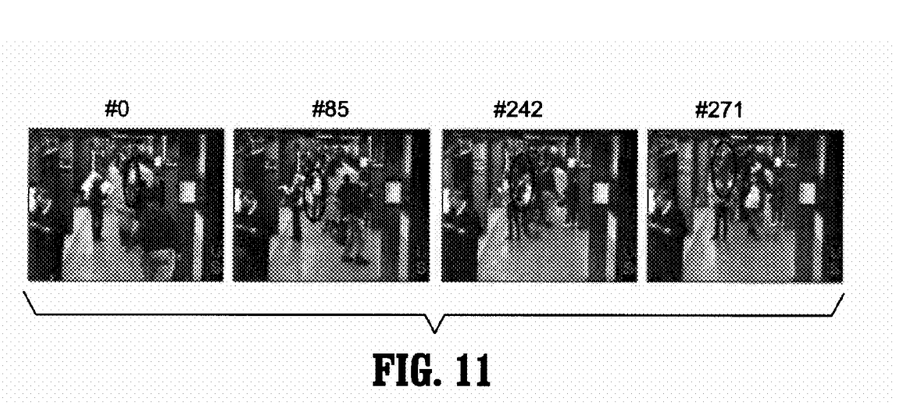
Figure 12:
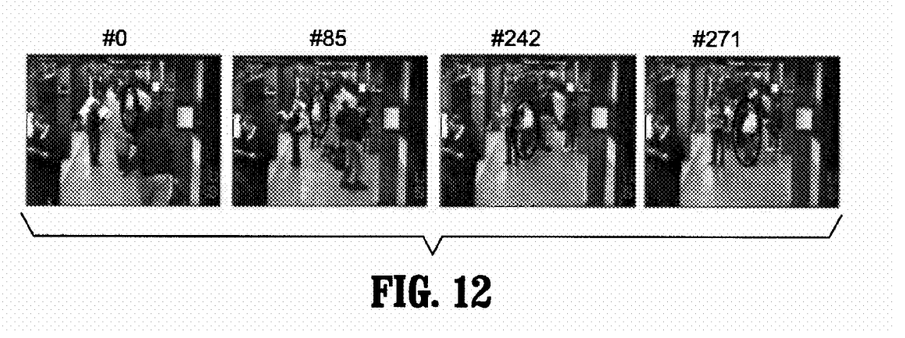

FIG. 7 is an exemplary computer system used to implement an embodiment of the present invention. Referring to FIG. 7, according to an exemplary embodiment of the present invention, a computer system 101 for implementing the invention can comprise, inter alia, a central processing unit (CPU) 102, a memory 103 and an input/output (I/O) interface 104. The computer system 101 is generally coupled through the I/O interface 104 to a display 105 and various input devices 106 such as a mouse and keyboard. The support circuits can include circuits such as cache, power supplies, clock circuits, and a communications bus. The memory 103 can include random access memory (RAM), read only memory (ROM), disk drive, tape drive, etc., or a combination thereof. An exemplary embodiment of the invention can be implemented as a routine(s) 107 for GUI based form field extraction and specification and is stored in memory 103 and executed by the CPU 102 to process the signal from the signal source 108. As such, the computer system 101 is a general purpose computer system that becomes a specific purpose computer system when executing the routine 107 of the present invention in an exemplary embodiment of the invention.

The computer platform 101 also includes an operating system and micro instruction code. The various processes and functions described herein may either be part of the micro instruction code or part of the application program (or a combination thereof) which is executed via the operating system. In addition, various other peripheral devices may be connected to the computer platform such as an additional data storage device and a printing device.

It is to be further understood that, because some of the constituent system components and method steps depicted in the accompanying figures may be implemented in software, the actual connections between the system components (or the process steps) may differ depending upon the manner in which the present invention is programmed in an exemplary embodiment of the invention. Given the teachings of the present invention provided herein, one of ordinary skill in the related art will be able to contemplate these and similar implementations or configurations of the present invention.

While the present invention has been particularly shown and described with reference to exemplary embodiments thereof, it will be understood by those skilled in the art that various changes in form and details may be made therein without departing from the spirit and scope of the present invention as defined by the appended claims.

What is claimed is:

1. A method, comprising:
providing a form a word processor format (WPF), wherein the form includes a table having at least a column or row;
converting the form into a portable document format (PDF) document, wherein the PDF document includes a grid that corresponds to the table such that cells of the grid correspond to cells of the table, and
generating an extensible markup language (XML) file that is not part of the PDF document,
wherein generating the XML file comprises:
for each cell of the grid of the PDF document, extracting x and y coordinate values of the PDF document for all corner edge points of the cell, wherein the extraction is not derived from text inside the table;
assigning the coordinate values of the cells to a database table and respective columns of the table; and
storing the assignments in the XML file, and
wherein the method is performed using a graphical user interface (GUI).

2. The method of claim 1, wherein the cells of the table comprise at least one of a header field, a footer field, a radio field or a data entry field.

3. The method of claim 2, wherein the header field, the footer field and the radio field comprise one or more sub-fields.

4. The method of claim 3, wherein at least one of the header field, the footer field and the radio field is selected by a user through the GUI as a group of the sub-fields bounded by a dialog box.

5. The method of claim 1, wherein each cell has four sides.

6. A system, comprising:
a memory for storing a program;
a processor in communication with the memory, the processor operative with the program to:
provide a form in a word processor format (WPF), wherein the form includes a table having at least a column or row;
convert the form into a portable document format (PDF) document, wherein the PDF document includes a grid that corresponds to the table such that cells of the grid correspond to cells of the table, and
generate an extensible markup language (XML) file that is not part of the PDF document,
wherein generating the XML file comprises:
for each cell of the grid of the PDF document, extracting x and y coordinate values of the PDF document for all corner edge points of the cell, wherein the extraction is not derived from text inside the table;
assigning the coordinate values of the cells to a database table and respective columns of the table; and
storing the assignments in the XML file.

7. A computer program product, comprising:
a computer readable storage medium having computer readable program code embodied therewith, the computer readable program code comprising:
computer readable program code configured to provide a form in a word processor format (WPF), wherein the form includes a table having at least a column or row;
computer readable program code configured to convert the form into a portable document format (PDF) document, wherein the PDF document includes a grid that corresponds to the table such that cells of the grid correspond to cells of the table; and
computer readable program code configured to generate an extensible markup language (XML) file that is not part of the PDF document,
wherein generating the XML file comprises:
for each cell of the grid of the PDF document, extracting x and y coordinate values of the PDF document for all corner edge points of the cell, wherein the extraction is not derived from text inside the table;
assigning the coordinate values of the cells to a database table and respective columns of the table; and
storing the assignments in the XML file.

8. The computer program product of claim 7, wherein the cells of the table comprise at least one of a header field, a footer field, a radio field or a data entry field.

9. The computer program product of claim 8, wherein the header field, the footer field and the radio field comprise one or more sub-fields.

10. The computer program product of claim 9, wherein the header field, the footer field and the radio field are selected by a user through a graphical user interface (GUI) as a group of the sub-fields bounded by a dialog box.

* * * * *